United States Patent [19]

List et al.

[11] 3,720,692

[45] March 13, 1973

[54] PRODUCTION OF PHTHALIC ANHYDRIDE FROM PHTHALIC ACID

[75] Inventors: Ferdinand List; Helmut Alfs, both of Marl, Germany

[73] Assignee: Chemische Werke Huls Aktiengesellschaft, Marl, Germany

[22] Filed: Dec. 2, 1969

[21] Appl. No.: 881,598

[30] Foreign Application Priority Data

Dec. 7, 1969 Germany..................P 18 13 391.0

[52] U.S. Cl.................................................260/346.7
[51] Int. Cl.................................................C07c 63/18
[58] Field of Search............260/346.7, 346.4, 346.3

[56] References Cited

UNITED STATES PATENTS 2,925,425  2/1960  Contois et al. ..................260/346.4
3,161,658  12/1964  Meyer ..............................260/346.3
3,137,660  6/1964  Jones................................260/2.2

OTHER PUBLICATIONS

Ono et al., Chem. Abstr. (1938) Vol. 32, p. 41433.

Primary Examiner—Alex Mazel
Assistant Examiner—Bernard Dentz
Attorney—Krafft & Wells

[57] ABSTRACT

Melt of phthalic anhydride containing a small amount of azeotroping agent is maintained at a temperature of from 160° to 200°C. Phthalic acid is introduced into the melt, and an azeotropic mixture of water and azeotroping agent is withdrawn therefrom. The withdrawn azeotroping agent is separated from the water in the azeotropic mixture and returned to said melt.

8 Claims, No Drawings

PRODUCTION OF PHTHALIC ANHYDRIDE FROM PHTHALIC ACID

BACKGROUND OF THE INVENTION

For processing, e.g., esterification with various alcohols, o-phthalic acid (PA) is advantageously employed in the form of its anhydride (PAN). When PA is heated (to form PAN) without the addition of an azeotroping agent, the amount of water liberated is inadequate to produce the desired product. Moreover, a large proportion of the thus-formed water of reaction runs back into the formed melt, resulting in a reformation of PA. The conversion is low and the produced PAN has a high acid number. The sublimation of PAN also presents difficulties in this mode of operation by clogging the withdrawal lines.

Attempts to overcome these difficulties by the use of conventional azeotropic agents, such as toluene, diethylbenzene, cumene and diisopropylbenzene, yield only unsatisfactory results. Although, under these conditions, obstructions by sublimate in the gas and condensation chamber are avoided, the reaction rate is too low, and too high a concentration of free acid remains in the melt. Obviously, the temperature of the melt, due to the formation of the azeotropic mixture, is reduced to such an extent that the production of PAN can take place only very sluggishly.

Consequently, there is need for a commercially feasible process to convert ortho-phthalic acid readily and completely into the anhydride on an industrial scale.

Although there are fundamentally different conventional methods for preparing PA (Kirk-Othmer, "Encyclopedia of Chemical Technology." 2nd Edition, Vol. 15, page 450, (1968), and the conversion of PA to PAN is not dependent upon the method according to which the PA was prepared, there is an additional advantage to the instant method for preparing PAN when the PA starting material is conventionally obtained by oxidizing o-xylene in the liquid phase, for example with air, in glacial acetic acid in the presence of a bromine-activated soluble heavy metal catalyst system.

SUMMARY

A melt of PAN and a small amount of azeotroping agent is prepared and maintained at an elevated temperature. PA is introduced into the melt; azeotroping agent and water of reaction entrained thereby are withdrawn from said melt. After separating the withdrawn water from the withdrawn azeotroping agent, the latter is returned into the melt. Additional PA can be introduced into the melt either from time to time or continuously; likewise, PAN can be withdrawn from the melt intermittently or continuously.

DETAILS

Although continuous operation is practical and is readily effected, it is preferred to introduce the PA into the melt initially in batches. The melt is maintained at a temperature of from 160° to 200°C, and preferably from 170° to 185°C.

The azeotroping agent is any known hydrocarbon which forms an azeotrope with water. Examples are benzene, toluene, ethylbenzene, o-xylene, m-xylene, p-xylene, cumene, diethylbenzene, diisopropylbenzene and a mixture of any combination of two or more of the foregoing.

Although the individual substances exhibit varying boiling points, they do not influence the temperature of the melt, since they are present practically only in the space immediately above the melt.

It is essential that only a small amount of azeotroping agent be present in the melt. The water of reaction formed by producing PAN from PA is immediately removed from the cycle with a small amount of azeotroping agent. Advantageously, the amount of azeotroping agent in the reaction chamber is from 5 to 40, preferably from 10 to 25 percent by weight, based on the weight of the PAN present.

Of the illustrated azeotroping agents, it is particularly advantageous to employ o-xylene, even though the boiling point of this compound is only 144°C.

The utilization of this hydrocarbon affords the advantage that the oxidation of o-xylene to o-phthalic acid and the conversion of the latter to phthalic anhydride can be conducted in successive process stages without introducing any foreign substance into the total process. The o-xylene can be directly recycled into the oxidation stage.

Although the amount of PA introduced into the melt can be as much as 25 times the weight of PAN in the melt, said amount is advantageously maintained below 10, preferably 4 to 8, especially about 6 times said weight.

The concentration of PA in the PAN melt can vary within wide ranges due to the fact that the PA immediately after its addition begins to react, and this reaction comes to an end if no fresh PA is added then.

Without further elaboration, it is believed that one skilled in the art can, using the preceding description, utilize the present invention to its fullest extent.

EXAMPLE 1.

250 kilograms of phthalic anhydride are melted in a vessel having a stirrer and heated to 170°C. The stirred vessel is equipped with a reflux condenser and a water trap. 50 kg. of o-xylene are introduced into the melt vessel and, in parallel therewith, 1.6 (metric) tons of o-phthalic acid are also gradually added. At 170°C, a very strong water cleavage occurs. The water of reaction, which is withdrawn overhead together with o-xylene, is separated in the trap and discarded, whereas the xylene flows back into the stirred vessel. After a total production of 180 kg. of $H_2O$, the dehydration is terminated. The dehydrating period is 20 minutes. The thus-obtained crude phthalic anhydride exhibits the following analytical values:

Acid number: 735 (theory: 757)
Melting point: 127°C (literature: 131°C)

The yield is practically quantitative.

The process for producing PAN is conducted continuously by continuously withdrawing phthalic anhydride melt from the sump of the stirrer, with the amount of o-xylene remaining the same, and by correspondingly introducing o-phthalic acid into the vessel. The water of reaction is continuously separated in the trap and discarded.

Replacing the o-xylene with either 25 kg. or 62.5 kg. of o-xylene yields the same results. Replacing the o-phthalic acid with 830 kg. of PA results in the removal of 90 kg. of water prior to the termination of dehydration.

Replacing the o-xylene with 50 kg. of either benzene, toluene, ethylbenzene, diethylbenzene, cumene, diisopropylbenzene or a commercial mixture of o-, m- and p-xylene yields essentially the same results.

EXAMPLE 2.

PA is prepared by liquid phase air oxidation of o-xylene in acetic acid (as solvent) with a bromine-activated heavy metal catalyst system (Kirk-Othmer, supra, p. 451). Resulting PA (2490 kg.) and unconverted o-xylene are gradually introduced together into a PAN melt (as described in Example 1) without the addition of any further o-xylene or other azeotroping agent. As the water of reaction is removed with o-xylene, it is separated from the latter, the thus separated o-xylene is recycled for the production of further PA, which is introduced with unconverted o-xylene into the PAN melt. As the PAN melt increases in volume, some is drawn off to maintain an essentially fixed level. The conversion of o-xyene to PAN is thus effected continuously.

We claim:
1. A process for preparing phthalic anhydride by splitting off water from phthalic acid which comprises
   a. introducing phthalic acid into a melt of phthalic anhydride containing in contact therewith a small amount of a hydrocarbon azeotroping agent sufficient to form an azeotrope with the water split off from said phthalic acid, the melt being maintained at a temperature of from 160° to 200°C,
   b. withdrawing water and azeotroping agent from said melt,
   c. separating withdrawn water from the azeotroping agent, and
   d. replacing in contact with said melt azeotroping agent approximating the amount withdrawn therefrom.
2. A process for preparing phthalic anhydride comprising:
   a. preparing a melt of phthalic anhydride containing in contact therewith about 5 to 40 percent by weight of a hydrocarbon azeotroping agent which forms an azeotrope with water based on the weight of said phthalic anhydride and maintaining said melt at a temperature of about 160° to 200°C;
   b. introducing phthalic acid into said melt and converting to phthalic anhydride by splitting off water;
   c. withdrawing said water and a portion of said azeotroping agent from said melt;
   d. separating said water from said portion of azeotroping agent; and
   e. replacing approximately said portion of azeotroping agent in contact with said melt.
3. A process according to claim 2, wherein said portion of azeotroping agent is recycled to contact with said melt.
4. A process according to claim 2, wherein a portion of the phthalic anhydride melt is withdrawn as more phthalic anhydride is produced.
5. A process according to claim 2, wherein the azeotroping agent is a member selected from the group consisting of benzene, toluene, ethylbenzene, diethylbenzene, cumene, diisopropylbenzene, o-xylene, m-xylene, p-xylene and a mixture of at least two of any of the foregoing.
6. A process according to claim 5, wherein the azeotroping agent is o-xylene.
7. A process according to claim 6, wherein said portion of azeotroping agent is recycled to a liquid phase preparation of phthalic acid from o-xylene and resulting phthalic acid is introduced with associated unconverted o-xylene into the phthalic anhydride melt.
8. A process according to claim 3, wherein the phthalic acid is introduced batchwise into the phthalic anhydride melt.

* * * * *